United States Patent Office 3,454,647
Patented July 8, 1969

3,454,647
METHOD OF PREPARING BIS(BETA HYDROXY-PROPYL) ETHYLENE DIAMINE
Paul W. Kersnar and Samuel Taormina, San Francisco, Calif., assignors to Progressive Products Co., San Francisco, Calif., a corporation of California
No Drawing. Continuation-in-part of application Ser. No. 476,193, July 30, 1965. This application Sept. 13, 1966, Ser. No. 578,963
Int. Cl. C07c 85/02, 91/06
U.S. Cl. 260—584                                    3 Claims

ABSTRACT OF THE DISCLOSURE

Bis(beta hydroxypropyl) ethylene diamine is selectively precipitated from an aqueous solution of ethylene diamine reacted with about 1.3 to 4.5 mols of propylene oxide per mol of ethylene diamine added to the solution, when the concentration of ethylene damine is at least about 35% by weight of the total weight of ethylene diamine and water.

---

This application is a continuation-in-part of applicants' copending application, Ser. No. 476,193, filed July 30, 1965 for "Cleaning Composition, Intermediate for the Preparation Thereof, and Process of Making the Same," now U.S. Patent No. 3,398,097. The invention hereof relates to the preparation of the compound bis(beta hydroxypropyl) ethylene diamine in free flowing crystalline form, and to the method of isolating the same. Such compound is represented by the following formula:

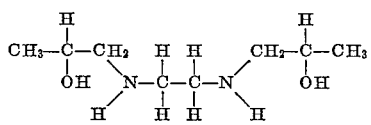

As is disclosed in the aforementioned copending application, the reaction product of ethylene diamine and propylene oxide, which are both liquids, in an aqueous vehicle proceeds exothermically and is extremely violent unless carefully controlled. One of the bonds in the epoxy group of the propylene oxide molecule splits and combines with a hydrogen atom attached to a nitrogen atom of an ethylene diamine molecule, and forms a hydroxy group; and the nitrogen from which such hydrogen has migrated becomes attached to the carbon atom of the epoxy group from which the bond has split. This reaction in equal molar ratios may be expressed theoretically as follows:

Propylene oxide + Ethylene diamine

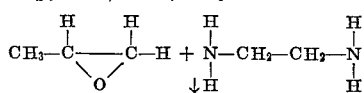

Mono (beta hydroxy propyl) ethylene diamine

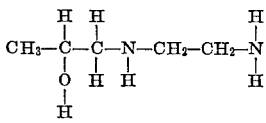

Beta hydroxy propyl grout forming the reaction product mono(beta hydroxypropyl) ethylene diamine.

However, although the above is the theoretical reaction, the mono compound forms in liquid mixture with other (beta hydroxypropyl) ethylene diamines, such as the bis, tris and tetra compounds; and as the molar ratio of propylene oxide to the ethylene diamine increases, liquid mixtures of the bis, tris and tetra (beta hydroxypropyl) ethylene diamines with the mono compound, are favored. Such copending application relates, among other matters, to the formation of a liquid reaction product containing mixtures of the mono, bis, tris and tetra compounds in which the advantageous bis compound is predominant. Pursuant to this invention, it has been found that under controlled conditions the bis compound can be selectively precipitated from the reaction vehicle containing the other (beta hydroxypropyl) ethylene diamines, and isolated very readily in substantially pure solid crystalline form.

Summarizing the invention hereof, it has been found that when the initial or starting concentration of ethylene diamine in water, to which propylene oxide is gradually added, exceeds a predetermined amount, and the reaction is conducted under non-forcing conditions as explained in the aforementioned copending application and hereinafter, a solid precipitate of the bis(beta hydroxypropyl) ethylene diamine is formed within a wide molar ratio of propylene oxide to the ethylene diamine. This precipitate can be readily isolated from the reaction vehicle by filtration, and is a water-soluble substantially pure crystalline product of the bis compound, except for minor amounts of mono, tris and tetra compounds formed in the liquid phase and which become occluded in the precipitate. The precipitate, however, may be readily purified by dissolving it in a suitable solvent as explained hereinafter, and recrystallizing it therefrom; and when dry, it is in free flowing crystalline form.

The invention has as its objects, among others the production of the isolated solid crystalline compound, bis(beta hydroxypropyl) ethylene diamine resulting from the reaction of propylene oxide and ethylene diamine, which when reacted with other compounds is useful for many purposes and which can be employed for the production of chelating agents, detergents, rust removal and cleaning agents, and corrosion inhibitors, among other uses; and the provision of a simple and economical method for forming and isolating such compound as a solid in substantially pure form. Other objects of the invention will become apparent from the following more detailed description.

The molar ratios of the propylene oxide to ethylene diamine can vary within a range of from about 1.3 to 1 to 4.5 to 1; and desirably within a practical range of from about 2.0 to 1, to 4.0 to 1. If much below 1.3 to 1, the yield of the solid bis compound will not be substantial, while if the molar ratio is much above 4.5 to 1, there is a tendency for the solid bis compound precipitate to dissolve and form higher homologs, but regardless of such molar ratios, the bis compound will precipitate and can be separated by filtration provided the starting concentration of the ethylene diamine in water is sufficiently high to result in formation of the bis precipitate.

As for the starting concentration of the ethylene diamine in water, repeated tests have established that if such concentration is less than about 28% by weight based on the total weight of water and ethylene diamine, the bis precipitate will not form. At about 35% and above, the precipitate of the bis compound always forms. In the intermediate range of about 28 to 35%, the solid bis compound sometimes precipitates and sometimes it does not. Consequently, to insure formation of the precipitate of the bis compound, the initial, starting concentration of the ethylene diamine in water should be at least about 35% by weight based on the total weight of water and ethylene diamine.

At a relatively high concentration of ethylene diamine in water, such as about 80% or more, the reaction proceeds with violence, almost with explosive force; and decomposition products are formed, such as ammonia, substituted glycols, and possibly amine alcohols. Therefore, the maximum starting concentration of the ethylene diamine in water should not be above about 80%, and desirably not much above 75%. The reaction is conducted under such non-forcing conditions that substantially no decomposition products are formed. In other words, the reaction is effected in the aqueous medium by gradual addition, either continuously at a slow rate or stepwise, of the propylene oxide to the ethylene diamine at atmospheric pressure and at a temperature desirably below about 70° C.

The resultant solid bis compound precipitate is useful for the production of compositions, such as detergents, and metal ion sequestering agents. It can also be employed per se in aqueous solutions in wide proportions for neutralization or increasing pH, as an acid acceptor or inhibitor, or as a corrosion inhibitor.

Of particular usefulness in detergents is the reaction product of the bis compound with sulfonic acids, especially benzene sulfonic acid (either branch chain or linear alkylated) having an alkyl group varying from $C_{9-15}H_{19-30}$ attached to benzene, and advantageously dodecyl benzene sulfonic acid. The molar ratio of the sulfonic acid to such intermediate may vary widely depending on the particular purpose for which the composition is adapted. Soaps formed with saturated fatty acids, such as stearic acid and with unsaturated fatty acids, such as oleic, are also advantageous reaction products for detergent purposes. An advantageous carbonyl group for unsaturated fatty acids may vary from $C_{14-18}H_{27-35}$, and for saturated fatty acids from $C_{14-19}H_{29-39}$. As with respect to sulfonic acids, the molar ratio of the intermediate to fatty acids may also vary widely.

Because the bis compound precipitate hereof is substantially pure, and therefore has a definitive content of the beta hydroxy propyl groups, the precipitate is of particular advantage as an intermediate for uses where a specific reaction product of a definite structure is required, in contradistinction to varying reaction products which result when the intermediate is a mixture of mono, bis, tris and tetra (beta hydroxypropyl) diamines. Thus, when one mole of the substantially pure bis compound is reacted with substantially two moles of monochloro acetic acid, the resultant reaction product provides an excellent chelating agent for metallic salts such as those of iron, calcium, and trace metals. Of particular advantage and in contrast to the usual organic chelates, such as the common ethylene diamine tetraacetate, is the fact that the mono or di acetate of bis (beta hydroxypropyl) ethylene diamine in its acid form is water-soluble, thus rendering the chelates prepared from the products of this invention usable in pH ranges from about 1.5–13.5.

Another and very important property of the bis(beta hydroxypropyl) diamine is that of passing substantially directly to the vapor form when heated at substantially its melting point. In other words, the compound sublimes. Thus, when incorporated in polar or non-polar solvents, the compound will distribute itself depending on its vapor pressure in both the liquid and vapor phases. This is of particular importance where the compound is employed as a corrosion or rust inhibitor in such solutions because the resultant vapor will distribute itself uniformly over the metallic parts being treated upon application of heat to such solution.

As previously mentioned, to effect formation of the bis compound precipitate, the starting concentration of the ethylene diamine in water should desirably exceed about 35% by weight of the total solution and, desirably between about 35% and 75% by weight. Upon introduction of the propylene oxide into the aqueous ethylene diamine solution, the reaction proceeds solely exothermically, and is desirably conducted under atmospheric conditions to obviate the possibility of decomposition products.

Gradual addition at a slow, continuous rate or gradual stepwise addition in small increments, of the propylene oxide, while stirring the mixture is also important in avoiding decomposition products; and to preclude excessive rise in temperature above about 70° C., cooling of the reaction vehicle during the reaction is employed whenever it is noted that the temperature begins to rise rapidly. Forcing conditions in the reaction can be readily determined by observation because of a notable and marked boiling effect which occurs if the propylene oxide is introduced too rapidly and at too great an amount at one time. Likewise, one can readily determine when the reaction is complete when the boiling effect disappears.

The precipitate of the bis compound will always form when the starting concentration of the ethylene diamine in water is sufficient. However, the yield of the precipitate will vary depending on the starting concentration, and the molar ratios between the propylene oxide and the ethylene diamine, as indicated by the following table, which is illustrative of such variations, and which is based upon averages of numerous determinations in each instance.

TABLE

| Starting concentration of ethylene diamine in water (percent by wt.)[1] | Molar ratio, propylene oxide to ethylene diamine | Yield of crystalline bis compound (percent by wt.)[2] |
|---|---|---|
| 35.0 | 1.35–1 | 1.3 |
| 35.0 | 3–1 | 5.0 |
| 50.0 | 4–1 | 14.0 |
| 46.00 | 2–1 | 26.3 |
| 43.00 | 3–1 | 26.0 |
| 75.0 | 2–1 | 34.0 |

[1] Percent by weight based upon total weight of ethylene diamine and water.
[2] Percent by weight of bis solid formed, based on the total amount of water, and the reactants (ethylene diamine and propylene oxide).

The above table establishes that the bis compound precipitate will form when the ethylene diamine concentration is at least 35%, but only the yield will vary depending upon the molar ratios of the reactants and the starting concentrations of ethylene diamine. The supernatant liquid will be a mixture of the mono, bis, tris and tetra compounds in which substantially all groups attached to the nitrogen atom are the beta hydroxy propyl groups. Consequently, such supernatant liquid is useful for the various purposes disclosed in the aforementioned copending application.

The precipitate of the bis compound can be readily filtered; and after such filtration, it has a snow white powdery appearance. When dried in a conventional manner, such as by oven drying or air drying, to substantially constant weight, it will be free flowing and substantially pure except for very minor amounts of the supernatant liquid compounds which will be occluded therein. Its molecular weight will vary from about 182 to 188 (the theoretical molecular weight of the bis compound being 176) depending on the reaction conditions and molar ratios, and its melting point about 125° C. to 135° C. also depending on such reaction conditions. However, the absolutely pure compound can be readily obtained by dissolving the separated bis precipitate in any suitable solvent in which it is only soluble by application of heat, but insoluble at room temperature, such as isopropyl alcohol or acetone, and from which it will recrystallize in solid state upon cooling of the solvent.

For example, 2% to 50% by weight of the precipitate based on the total weight of solvent and precipitate can be dissolved in isopropyl alcohol at an elevated temperature until all the bis compound has dissolved. Upon cooling of the solution to room temperature, the bis compound crystallizes out. The same procedure can be repeated until an absolutely pure compound is obtained having a melting point of about 145° C., and a sintering point of about 135° C. Molecular weight determinations give a molecular weight of about 176 (which is the theoretical molecular weight). Absorption bands from infrared spectromery confirmed the presence of isopropyl groups, the absence of ether (—C—O—C—) linkages, and the presence of amine and hydroxyl groups; and acetylation confirmed the presence of both amine and hydroxyl groups in amounts closely approximating the theoretical.

The following are typical examples illustrative of the preparation of the bis(beta hydroxypropyl) ethylene diamine hereof.

Example I

To 57.0 kgs. of water in a vessel equipped with an agitator and cooling coils are added at one time 43.0 kgs. of pure ethylene diamine providing a final concentration by weight of ethylene diamine of 43%. Propylene oxide is then introduced below the surface of the solution in a steady continuous stream with agitation and cooling at such a rate that the temperature is kept in the range of about 50–60° C. until a total of 122.1 kgs. of propylene oxide have been added. This takes about 2½ hours. The molar ratio is about 3 propylene oxide to 1 ethylene diamine.

When the reaction is complete as evidenced by no further heat of reaction being emitted, the reaction mixture is cooled to about 18° C. The reaction mixture is a viscous mass containing a white precipitate. The mixture is then filtered under vacuum. The separated solid, which is essentially bis (beta hydroxypropyl) ethylene diamine is then air and oven dried to a free flowing crystalline powder. The yield of dry solid is 57.8 kgs. or 26% by weight of the whole amount of reactants and water. The apparent molecular weight from titration is 184. The supernatant liquid of the filtrate is approximately a 65% aqueous solution of a mixture of mono, bis, tris, and tetra (beta hydroxypropyl) ethylene diamines in which the mole ratio of propylene oxide to ethylene diamine is approximately 3.5 to 1, and can be used for the purposes described in the aforementioned application, Ser. No. 476,193.

Example II

In the same type of vessel as in Example I, 75.0 kgs. of pure ethylene diamine are admixed with 25.0 kgs. of water for a final concentration of ethylene diamine of 75% by weight. Propylene oxide is then admitted as in Example I, at such a rate that, with agitation and external cooling, the temperature does not exceed about 70° C., and is kept generally in the range of about 60–70° C., until a total of 145 kgs. of propylene oxide have been reacted. This takes about 2 hours; the molar ratio being 2 propylene oxide to 1 ethylene diamine. The resultant solid-liquid mixture is separated by vacuum filtration, as in Example I.

The yield of the essentially dry bis compound dry product is 83.3 kgs. or about 34% by weight of the total amount of reactants and water, and the apparent molecular weight of the product is 182. The filtrate is approximately an 85% by weight aqueous solution of a mixture of mono, bis, tris, and tetra (beta hydroxypropyl) ethylene diamines, whose average composition is in the approximate molar ratio of 2 propylene oxide to 1 ethylene diamine, and can also be used for the purposes disclosed in the aforementioned application, Ser. No. 476,193.

Example III

The following is an example for obtaining the absolute pure bis compound prepared in the manner previously described.

Employing the resultant substantially pure product of Examples I or II, 0.4 kg. of either product is admixed with 1 kg. of isopropyl alcohol and the mixture is heated to about 60° C. At this point, the solution is clear. The mixture is then cooled to room temperature and a resultant precipitation of the bis compound occurs. The mixture is filtered under vacuum and the reasultant separated solid is air dried. The yield of solid so obtained is 0.35 kg. and the molecular weight is 180. This separated solid is again dissolved in 1 kg. of isopropyl alcohol and treated in the same manner as already described. The yield after a second treatment is 0.32 kg. and the molecular weight is 178. The solid resulting from this second treatment is again dissolved in 1 kg. of isopropyl alcohol and again treated in the same manner as described. The yield of resulting solid obtained is 0.27 kg., and the molecular weight is 176. This is the absolute pure bis (beta hydroxypropyl) ethylene diamine.

The bis compound obtained in any other particular manner according to the teachings hereof may be purified in the same way.

The following are examples of typical formulations embodying the bis (beta hydroxypropyl) ethylene diamine compound for various of the aforementioned uses. In these examples, such bis compound employed is the compound resulting form either Examples I or II which have not been purified in accordance with Example III. However, the absolute pure compound can be employed. Also, in such following examples, the bis compound can be made in any other particular manner in accordance with the teachings hereof.

Example A

The bis compound hereof has the important property of resistance to change the pH (buffering capacity) when reacted with strong mineral acids, such as hydrochloric or sulfamic. Thus, if 2.8 grams of the solid bis compound dissolved in 15 cc. of distilled water is titrated with 6 normal hydrochloric acid, it is found that 0.3 cc. of the hydrochloric acid will reduce the pH of the solution from about 12 to 10, or 0.15 cc. hydrochloric acid per pH value. However, it takes an additional 3.2 cc. of the 6 normal hydrochloric acid to reduce the pH of the resulting solution from 10 to 4, or about 0.53 cc. per pH value.

Such property is useful in providing superior acid inhibition in any type of acid cleaner for metal, glass, porcelain, and other surfaces. For example, a suitable composition for toilet bowl cleaning comprises 2 grams of the solid bis compound, 10 grams of 100% hydrochloric acid, and 88 grams of water. Such type of composition will also remove rust and other stains from toilet bowls or the like without excessive fuming.

Example B

Another application in which such buffering property is advantageous is in the formation of rust removing formulations for fabric textiles, such as wool, cotton, nylon, Dacron or acetate fibers. For example, a composition which contains as little as 1 part by weight of the bis solid, 25 parts by weight of 100% hydrofluoric acid, and 74 parts by weight water, is adequately inhibited, but still allows sufficient free hydrofluoric acid to be efficient in the removal of rust from such fabrics, merely by contact, such as by rubbing or immersion, and subsequent water rinsing.

Example C

In this example, the reaction of the bis compound with dodecyl benzene sulfonic acid provides a product suitable as a detergent for hard surface cleaning, such as furniture, floors, walls, or metal surfaces.

The particular product is made by dissolving 18 kg. of the bis compounds in 200 kg. of water. 10 grams of commercial linear dodecyl benzene sulfonic acid are then added to the mixture with agitation at room temperature, and agitated until the dodecyl benzene sulfonic acid is completely dissolved, which can be ascertained when the solution is entirely clear. The resultant product may be used as is for badly soiled surfaces, or for lesser soiled surfaces dissolved further in water in the amount of about 1 to 4 ounces per gallon of water. The resulting solution cleans floors, walls, furniture, or metal surfaces with great efficiency, and has the further property of minimizing irritating effects on human skin without the further addition of so-called emollient compounds.

Example D

Another type of detergent composition is formed by the reaction of the bis compound with a suitable fatty acid to provide a soap.

When 20 kg. of the bis compound are dissolved in 200 kg. of water, 12 kg. of commercial triple pressed stearic acid are added with agitation which is continued until the stearic acid is completely dissolved as evidenced by a clear solution. In order to facilitate solution, the mixture is desirably warmed to about 40–50° C. The resultant product can be used as is for cleaning badly soiled surfaces, or for lesser soiled surfaces diluted in the amount of about 2 to 8 ounces per gallon of water. It is advantageously useful as a cleaner for metal surfaces, such as flatwork ironers. Besides the cleaning efficiency derived from this resultant product, another important advantage is that the surface so cleaned tends to resist both corrosion, and build up of such materials as starch on the metal surface of the ironer.

Example E

As previously related, the bis compound hereof has the important property of passing substantially directly to the vapor form when heated at substantially its melting point. This is desirable in the formulation of corrosion inhibiting compositions in which protection in both the vapor and liquid phases is desired. For example, when one-half ounce of the solid bis compound as such, is added daily to the make-up water of a 7½ horsepower boiler operating at substantially 80 pounds pressure, over a period of two months, no evidence of rust within the boiler shell or in the effluent steam lines was noticed.

We claim:

1. The method of making and isolating bis(beta hydroxy propyl) ethylene diamine represented by the following formula:

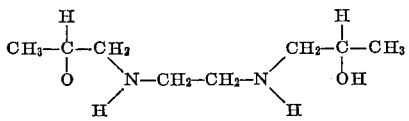

which comprises providing an aqueous solution of ethylene diamine having a concentration of ethylene diamine of about 35% to 80% sufficient to result in formation of a precipitate of such bis compound when propylene oxide is added to the solution and reacts with said ethylene diamine, gradually mixing into said solution about 1.3 to 4.5 mols of said propylene oxide per mol of ethylene diamine, and allowing the reaction to proceed exothermically under non-forcing conditions by controlling the rate and amount of propylene oxide added to obviate rapid temperature rise and a resultant boiling effect, and thus effect precipitation of said bis compound.

2. The method of claim 1 wherein the concentration of the ethylene diamine in water is about 35 to 75% and the reaction is allowed to proceed exothermically while the temperature is maintained below about 70° C. under atmospheric pressure.

3. The method of claim 2 wherein said molar ratio is about 2 to 4, to 1.

References Cited

Steck et al.: Journal of the American Chemical Society, vol. 79 (1957), pp. 1414 to 1417.

CHARLES B. PARKER, *Primary Examiner.*

R. L. RAYMOND, *Assistant Examiner.*

U.S. Cl. X.R.

252—152, 392; 260—490